United States Patent
Duvernier et al.

(10) Patent No.: US 10,414,405 B2
(45) Date of Patent: Sep. 17, 2019

(54) METHOD FOR DETERMINING A LIMIT SPEED FOR DRIVING

(71) Applicant: COMPAGNIE GENERALE DES ETABLISSEMENTS MICHELIN, Clermont-Ferrand (FR)

(72) Inventors: Marc Duvernier, Clermont-Ferrand (FR); Antoine Paturle, Clermont-Ferrand (FR); Benjamin Levrard, Clermont-Ferrand (FR); Jean-Louis Linda, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 58 days.

(21) Appl. No.: 15/575,488

(22) PCT Filed: May 20, 2016

(86) PCT No.: PCT/EP2016/061474
§ 371 (c)(1),
(2) Date: Nov. 20, 2017

(87) PCT Pub. No.: WO2016/185030
PCT Pub. Date: Nov. 24, 2016

(65) Prior Publication Data
US 2018/0170391 A1   Jun. 21, 2018

(30) Foreign Application Priority Data
May 20, 2015   (FR) .................................. 15 54504

(51) Int. Cl.
*B60W 40/064*   (2012.01)
*B60W 30/14*   (2006.01)
(Continued)

(52) U.S. Cl.
CPC ........ *B60W 40/064* (2013.01); *B60W 30/045* (2013.01); *B60W 30/146* (2013.01);
(Continued)

(58) Field of Classification Search
CPC ............. B60W 40/064; B60W 40/068; B60W 30/045; B60W 30/146; B60W 2550/148;
(Continued)

(56) References Cited

U.S. PATENT DOCUMENTS

| 6,208,927 B1 * | 3/2001 | Mine | .................. B60K 31/0058 |
| | | | 701/70 |
| 7,096,098 B2 | 8/2006 | Auguet et al. | .................. 701/22 |

(Continued)

FOREIGN PATENT DOCUMENTS

| EP | 1 074 421 A2 | 2/2001 |
| EP | 2 082 939 A2 | 7/2009 |

(Continued)

OTHER PUBLICATIONS

International Search Report issued by WIPO dated Dec. 2, 2016, in connection with International Application No. PCT/EP2016/061474 (with English translation attached).

(Continued)

*Primary Examiner* — Michael J Zanelli
(74) *Attorney, Agent, or Firm* — Venable LLP

(57) ABSTRACT

A method for determining a limit speed for driving, for a driver at a vehicle's steering wheel, includes a step of estimating a grip potential available at a given instant between a tire of the vehicle and a roadway on which a tire of the vehicle is running. The grip potential is estimated as a function of at least one of: a known influencing parameter, and a measured influencing parameter. The method also includes a step of determining a need for grip as a function of a driving situation of the vehicle and driving character- (Continued)

istics of the driver. The method further includes a step of determining a limit speed for driving as a function of the need for grip and the estimated grip potential. By virtue of the limit speed for driving, it is possible to prevent exceeding an estimate grip potential available.

16 Claims, 2 Drawing Sheets

(51) Int. Cl.
    *B60W 40/068*     (2012.01)
    *B60W 30/045*     (2012.01)
    *B60W 50/00*     (2006.01)
    *B60W 50/14*     (2012.01)

(52) U.S. Cl.
    CPC ....... *B60W 40/068* (2013.01); *B60K 2310/22* (2013.01); *B60W 2050/0077* (2013.01); *B60W 2050/0089* (2013.01); *B60W 2050/146* (2013.01); *B60W 2550/146* (2013.01); *B60W 2550/148* (2013.01); *B60W 2550/22* (2013.01); *B60W 2550/402* (2013.01); *B60W 2720/10* (2013.01)

(58) Field of Classification Search
    CPC ....... B60W 2550/22; B60W 2550/402; B60W 2550/146; B60W 2550/0089; B60W 2550/0077; B60W 2720/10; B60K 2310/22
    See application file for complete search history.

(56) References Cited

U.S. PATENT DOCUMENTS

| | | | | |
|---|---|---|---|---|
| 8,185,289 | B2* | 5/2012 | Tagawa | G01C 21/26 340/438 |
| 8,246,120 | B2 | 8/2012 | Bourqui et al. | 303/20 |
| 8,370,013 | B2 | 2/2013 | Linda et al. | 701/22 |
| 8,449,048 | B2 | 5/2013 | Bourqui et al. | 303/122.04 |
| 8,449,049 | B2 | 5/2013 | Bourqui et al. | 303/151 |
| 8,494,699 | B2 | 7/2013 | Bourqui et al. | 701/22 |
| 8,527,177 | B2 | 9/2013 | Linda et al. | B60T 8/172 |
| 8,634,990 | B2 | 1/2014 | Bourqui et al. | 701/48 |
| 8,731,767 | B2 | 5/2014 | Paturle | 701/31.4 |
| 8,731,878 | B2 | 5/2014 | Le Salver et al. | 703/2 |
| 8,798,919 | B2* | 8/2014 | Yano | G01C 21/3461 701/32.5 |
| 8,881,573 | B2 | 11/2014 | Paturle et al. | B60C 11/24 |
| 8,892,298 | B2 | 11/2014 | Paturle et al. | B60C 11/246 |
| 8,904,869 | B2 | 12/2014 | Paturle | B06C 11/24 |
| 9,103,688 | B2* | 8/2015 | Pivonka | G01C 21/3484 |
| 9,764,602 | B2 | 9/2017 | Paturle | B60C 11/24 |
| 9,821,815 | B2 | 11/2017 | Duvernier | B60W 40/12 |
| 2006/0287817 | A1* | 12/2006 | Nagel | B60W 30/09 701/507 |
| 2009/0012689 | A1* | 1/2009 | Spetler | B60T 8/1725 701/82 |
| 2009/0037062 | A1 | 2/2009 | Lee et al. | 701/70 |
| 2011/0295457 | A1 | 12/2011 | Linda et al. | 701/29 |
| 2012/0326856 | A1* | 12/2012 | Levin | B60W 50/0097 340/441 |
| 2013/0018562 | A1* | 1/2013 | Nakai | B60W 30/143 701/93 |
| 2014/0121997 | A1 | 5/2014 | Paturle | G01M 17/02 |
| 2016/0349219 | A1 | 12/2016 | Paturle et al. | G01N 29/14 |
| 2017/0341659 | A1 | 11/2017 | Duvernier et al. | B60W 40/09 |

FOREIGN PATENT DOCUMENTS

| | | |
|---|---|---|
| EP | 2 537 727 A1 | 12/2012 |
| IT | BO2009A000184 | 9/2010 |
| WO | WO 2015/092246 A1 | 6/2015 |

OTHER PUBLICATIONS

Dec. 2, 2016 International Search Report and Written Opinion in International Patent Appln. No. PCT/EP2016/0614743.

* cited by examiner

METHOD FOR DETERMINING A LIMIT SPEED FOR DRIVING

FIELD OF THE INVENTION

The present invention relates to the field of motor vehicles, and in particular the field of the systems and devices for assisting the driving of such vehicles.

RELATED ART

Motor vehicles are today equipped with numerous pieces of equipment for improving the safety of the driver and of the passengers of a vehicle. Brake assist systems (ABS) are thus known which make it possible to prevent the locking of the wheels in the case of intense braking. Electronic stability programs (ESPs) are also known, which make it possible, by controlling the path, to avoid the skidding of vehicles.

Moreover, it is currently noted that a considerable number of road accidents are still linked to loss of control of a vehicle, particularly in a bend, when the grip conditions are poorly estimated by a driver, who is therefore not aware of driving in an unsafe manner. However, the current systems mentioned above, such as ABS and ESP, do not always make it possible to avoid loss of control of the vehicle, for example due to taking a bend at an excessive speed.

It therefore appears useful to be able to recommend, to a driver, a limit speed to be observed for the forthcoming event provided on the route thereof, in order to avoid a loss of grip.

A system, developed by the company Pirelli, is known from the prior art, which system estimates in real time a safe speed linked to a local curvature of the road, and which compares it with an instantaneous speed of the vehicle. However, this system has several disadvantages.

On the one hand, this system uses a constant grip potential, depending on the type of tire fitted on the vehicle, without taking into account the environmental conditions, the state of the tire or the speed of the vehicle. Yet, it is known that these elements strongly influence the grip potential; thus, on a wet road, the grip potential at high-speed is, for example, much lower than at low speed, especially for a worn tire.

In addition, the proposed system does not make it possible to recommend a speed for a forthcoming route event, but indicates to the driver that the latter is in a risky situation in terms of vehicle grip. This system therefore does not allow anticipation by the driver to appraise the forthcoming event, for example a bend, under safe conditions for driving.

The aim of the present invention is to overcome these disadvantages by proposing a solution enabling real-time determination of a limit speed for driving, and the use thereof to provide a vehicle and/or a driver with relevant driving assistance information.

BRIEF DESCRIPTION OF THE INVENTION

Thus, the invention relates to a method for determining a limit speed for driving, the method comprising the following steps during which the grip potential available at a given instant between a tire of the vehicle and the roadway on which the tire is running is estimated as a function of known and/or measured influencing parameters, a need for grip on a future route event is determined as a function of a current or future driving situation of the vehicle, and as a function of this need for grip and of the estimated grip potential, a limit speed for driving is determined that makes it possible to not exceed the grip potential.

"Route event" means, in the remainder of the description, any characteristic portion of a future route, for example but not exclusively: a bend, a road segment with a steep slope or a steep banking, a road segment having particularly weak grip, for example due to a patch of black ice, to a gravel area or to any other event.

It is also pointed out that "available grip potential" means the maximum grip potential available at a given instant.

I—Estimating an Available Grip Potential

The estimation of a grip potential can be carried out in real time, i.e. there is an estimation of the potential of the pair tire/ground, on which the vehicle is currently driving, at the instant that the estimation is made. In a particular embodiment, the grip potential estimated at an instant n is considered to be identical at an instant n+1 if the parameters having an influence on the grip have not changed between the instants n and n+1.

The estimation can also be carried out in advance on a known future route, either due to the fact that the route has been recorded in a navigation system of the vehicle, or due to the fact that it is possible, from a GPS position of the vehicle, to know the road on which the vehicle moves.

I-1—Determining the Influencing Parameters

In a particular embodiment, a method according to the invention comprises an initial step of determining the parameters influencing the grip potential, these parameters being of the group comprising the roadway grip number or other standardized indicators of road grip, the sand depth of the road or mean texture depth called MTD, the water depth on the roadway, the temperature of the ground and of the surrounding air, the driving speed and all of the characteristics of the tire having an influence on the grip, notably but not exclusively the tire pressure, the tread pattern depth thereof, the load thereof, and the type of tire.

These influencing parameters are provided directly by the vehicle, and/or provided by an outside system, and/or measured in real time. Thus, for example, the roadway grip number or other standardized indicators of road grip can be provided by pre-existing maps. The temperature can be measured in real time, for example by sensors currently available on a vehicle.

The parameters of the tire, such as the pressure, the tread pattern depth, the load and the driving speed, can be determined by systems on board the vehicle or the tires.

In a particular embodiment, the initial step of determining influencing parameters comprises a step of measuring the sound power generated by the tire during driving, and a step of determining the water depth on the roadway, and the tread pattern depth as a function of this sound power. In another particular embodiment, the macrotexture of the road is also determined as a function of this sound power. To this end, the vehicle in which a method according to the invention is implemented must be supplied with a microphone fitted at the tires or in the front or rear bumpers of the vehicle.

The number of parameters having a potential impact on tire noise may be considerable. However, it appears that some parameters have a weak or second order influence on the nature of the noise generated by the tire. This may be the case, for example, for the internal pressure of the tire or for the tire load.

Thus, it appears that the weather state of the road, characterized by a water depth on the roadway, seems to be a first order parameter. The impact thereof on the noise of the tire is extremely great and especially weakly dependent on all the other parameters such as the state of the road surface, the wear state of the tire or the type of tread pattern of the tire. These other parameters can also, to a lesser extent, vary the driving noise insofar as it is possible to discern the specific acoustic signatures thereof.

As regards this water depth, a dry road is distinguished from a damp road, characterized by a water depth flush with the natural roughness of the road surface, or from a wet road for which the water depth exceeds the level of the natural roughness of the road surface.

In an exemplary embodiment, this water depth on the road is estimated by using one of the means of the group comprising:

fixed weather stations installed on the roadside, and comprising means for communicating, to the vehicles driving on the road, the water depth during the passage of these vehicles, optical sensors on board the vehicle, analytical models making it possible to estimate a residual water depth according to known weather data (amount of rainfall, sunshine, etc.) or to data concerning the road (drainability, banking, traffic, etc.).

With regard to the mean texture depth, a surface is described as a closed surface when it has a smooth appearance and is without macro-roughness, such as, for example, a bitumen having bled after having been subjected to high heat. A surface will be considered to be open when there is a considerable macro-roughness such as that of a worn surface or that of a country road repaired quickly by means of a surface coating produced by projecting pebbles on bitumen. A medium surface refers to all the surfaces in an intermediate state between the two previous states and more particularly describes the new surfaces. It is thus possible to categorize the various macrotextures in the following manner: a closed-macrotexture surface has a MTD between 0 and 0.4 millimeters. A medium-macrotexture surface has a MTD between 0.4 and 1.1 millimeters, and an open-macrotexture surface has a MTD greater than 1.1 millimeters. It is known that the macro-roughness of a surface strongly influences the noise generated by the tire. In particular, the phenomenon of pumping the air trapped between the ground and the tread pattern of the tire is all the more pronounced as the road surface is closed. Real-time knowledge of the state of a road can prove to be useful in the case where, for example, this information is sent back by a large number of vehicles or a fleet of dedicated vehicles to a centralized system for monitoring and maintaining the road network.

The tread pattern depth of the tire, which characterizes the wear state thereof, is classified as the new state, the worn state, and an intermediate state considered herein as the state of the tire with medium wear. Information on the progression over time of the wear characteristic is useful, especially if it is coupled with the information of the weather state of the road. Indeed, it is known that a vehicle equipped with worn tires that drives on a wet surface is more likely to lose the grip thereof than if it had new tires.

In an embodiment, the estimation of a remaining tread pattern depth is given in real time by one of the means of the group comprising:

sensors on board the tire, optical sensors evaluating the progression of the tread pattern depth, these sensors being on board the vehicle or fitted on the ground, magnetic sensors, on-board wear models taking into account the mileage travelled, the use, the vehicle type, wear measurement points undertaken by mechanical or optical means, etc.

The tire tread pattern type is, for example, a summer tread pattern or a winter tread pattern. These two types of tires differ from one another mainly by treads having different tread patterns, that are more directional and highly notched and siped in the case of winter tread patterns, and less directional and less notched in the case of summer tread patterns, as well as by the nature of the materials forming the tread, which is softer in the case of winter tires, and harder in the case of summer tires. These characteristics are not without influence on the behavior and the road holding of the vehicle, and therefore on the grip thereof.

I-2—Method Using a Mathematical Model

When the influencing parameters are known, several embodiments can be envisaged for determining the available grip potential. In a first preferred embodiment, a mathematical formula for estimating this grip potential as a function of speed is thus used. Thus, the potential can be calculated as follows:

$$\mu_{max}=f(\text{ground micro-roughness,speed,sand depth, water depth,tread pattern depth,inflation pressure,load}).$$

This function is specific to each tire that is available on the market and approved. All or some of the parameters indicated in this expression have previously been measured and/or determined beforehand, as previously described.

I-3—Method Using Graphs

In another embodiment, the step of determining a grip potential as a function of speed is carried out by using predetermined graphs for grip level. In this embodiment, several steps are implemented and will be described later in detail using figures:

grip level graphs are constructed according to influencing parameters and the availability thereof, the values of these parameters are measured in real time, the graph corresponding to the values of the parameters is selected, and the estimated value of the grip potential for the actual driving speed is read on the graph.

I-4—Rolling Radius Method

In another embodiment of the present invention, the step of determining an available grip potential comprises the following steps:

the progression of a rolling radius of the tire is assessed as a function of predetermined conditions for running of said tire on grounds of variable and known grip, in order to form an experimental database, the experimental database is used to establish a model for estimating the grip potential by determining a function connecting the grip potential to the rolling radius and to vehicle parameters, during running of the tire, the rolling radius is determined and, by application of said model, and as a function of the vehicle parameters, the grip potential of said tire is assessed.

Once the available grip potential has been estimated, a method according to the invention provides for determining a need for grip, as a function of the vehicle driving situation, and of the driving characteristics of the driver of the vehicle.

II—Estimating a Need for Grip

II-1—Estimating a Forthcoming Route Event

In an embodiment, in order to determine a need for grip on a future route segment, the progressions of the geometric properties of a future route segment, for example the curvature, the banking or the slope, are detected or identified. The position of the forthcoming route event, such as a bend, an intersection, or a compulsory stop, is also detected.

In order to detect these elements, it is useful to know the route, or at least part of the route, taken by the vehicle. In an advantageous embodiment, the route is programmed in the GPS navigation system of the vehicle, for example to assist the navigation of the driver, and it is easy to know the forthcoming route event.

In another embodiment, the route is not programmed in the vehicle, and it is then necessary to detect the road on which the vehicle is traveling, using a so-called "map-matching" method, which makes it possible to regularly compare GPS positions of the vehicle with map data, in order to determine the route taken.

When the coordinates of the forthcoming route event are known, it is then possible to determine a set of geopositioned points, describing this forthcoming route event; a table of points describing an approximate path which will be taken by the driver is then available.

II-2—Estimating the Need for Grip on the Forthcoming Event

When the approximate path taken by the driver on the forthcoming route event is known, it is then possible to estimate the need for grip on this event. Indeed, it is known that a vehicle of mass M, which vehicle is subjected to an event, is the center of an acceleration $\gamma(V)$ which is exerted in the plane of the vehicle. By using an analytical model for the complete vehicle, it is possible to deduce, for example, from this acceleration $\gamma(V)$, the forces at the wheel centre $F_x$, $F_y$ and $F_z$ for each tire of the vehicle, and calculate accordingly the need for grip $\mu tire(V)$ at each tire on this route event defined by:

$$\mu_{tyre} = \frac{\sqrt{F_x^2 + F_y^2}}{F_z}$$

It is pointed out herein that, in the tire reference frame, the axis representing the circumferential direction of the tire will be designated by the axis OX, the axis parallel to the axis of rotation of the tire or transverse axis by OY, and the axis normal to the axis of rotation of the tire, or radial axis, by OZ.

In an embodiment, a first simplifying assumption will be used which makes it possible to obtain a need for grip with a zeroth order precision. In the case where the forthcoming event is a curve, it is known that when a vehicle of mass M is recorded at a constant given speed in a bend of radius of curvature R, the acceleration experienced by the vehicle, the resulting force of which is absorbed by the roadway, is defined by $\gamma_y(V)=V^2/R$, in the absence of slope and banking.

According to a second simplifying assumption, considering the case where all the tires are identical and experience the same conditions, it is known that the principle of equilibrium of forces between those produced by the vehicle on the ground and those transmitted by the tire/roadway contact makes it possible to establish the formula $g \cdot \mu(V) = \gamma(V)$, g being the acceleration of gravity (in m/s$^2$), and $\gamma(V)$ being the acceleration in the plane of the vehicle (in m/s$^2$).

It is also useful, if the forthcoming event is a bend etc., to know the slope or the banking of the road in order to estimate, in the same manner, an acceleration experienced by the vehicle, and hence a need for grip.

In an embodiment, the forthcoming route event is a low-grip route segment, for example a patch of black ice or another element on the roadway. The vehicle may be aware in advance of the presence of a low-grip segment by receiving external data, in particular but not exclusively coming from another vehicle, and or from devices fitted on the roadside, and/or from maps and/or from data coming from road operators.

It is pointed out here that, in a simplified embodiment, it will be considered that the grip conditions on the future route are the same as the grip conditions at the place where the vehicle is located when the method is implemented in advance.

However, in some cases, it is advantageous to take account of the grip specific conditions on the future route, for example in the case of a road, the grip number of which changes.

III—Determining the Limit Speed for Driving

When the future route event is a curve, at each point a curvature can be estimated and a safe limit speed can be determined by the available grip limit condition of the tires. Thus, the limit speed on an event is that which makes it possible to achieve the balance between need for grip and grip potential, i.e. $\mu(V) = \mu_{max}(V)$.

In the case where all the tires are identical and experience the same conditions, and in the absence of banking and slope, the principle of equilibrium of forces between those produced by the vehicle on the ground and those that the tire/roadway contact can transmit makes it possible to establish the formula:

$$\gamma_y(V_{lim}) = (V_{lim})^2/R = g\mu_{max}(V_{lim}),$$

where g is the acceleration of gravity (in m/s$^2$). Solving this implicit equation in real time makes it possible to estimate the safe limit speed $V_{lim}$ on the target bend. However, this method, based on simplifying assumptions, makes it possible to fix the orders of magnitude and to set a target speed.

In an embodiment, this safety limit speed will be corrected with a safety margin. Indeed, in the absence of knowledge of the future accelerations $\gamma_x$, resulting from the actions of braking or of acceleration of the driver and/or of a slope in the road, it is useful to decrease the safe limit speed in order not to risk a loss of grip which would be caused by a grip consumption in the longitudinal direction which in fact reduces the grip available in the transverse direction.

In another embodiment where the forthcoming route event is, for example, a straight line having a steep slope and/or a steep banking, the consequent acceleration experienced by the vehicle will be estimated and the limit speed not to be exceeded will then be determined so that this acceleration makes it possible to respect the grip limits. The same applies to any other route event.

Furthermore, and considering that the information on a constantly fluctuating limit speed is not relevant for the driver, the following assumptions have been used in the chosen embodiment:

it is assumed that, over the most pronounced areas of curvature of a bend (the apex), the acceleration is overwhelmingly transversal, which is quite well verified. The margin of error caused by this assumption is reported to the error bar of the limit speed display. The equation is solved for all local maximum curvatures detected over the projected distance, and it is assumed that, around the limit speed, all tires are at the available maximum grip potential.

IV—Driver Alert and Information Device

The limit speed for driving which has been determined in this way can be visually indicated to the driver, in order to enable the latter to adapt the driving thereof In the event that the forthcoming route event is a bend, the display of the information will be different depending on whether the forthcoming future bend on the route is a separate bend, or if it is chained to one or more other bends. Bends will be considered to be chained if the distance between them is less than a certain threshold, for example 40 meters.

Thus, in the case of a separate bend, the limit speed for this bend will be displayed, for example. It will also be possible, optionally, to display the distance to reach this bend, and the direction of the bend.

In the case of a bend chain, the lowest limit speed of all the limit speeds of the bends making up the chain will be displayed, for example, and optionally the distance to reach the beginning of the chain. The displayed limit speed is updated with progression through the chain, in order to always be equal to the minimum of the limit speeds of the remaining bends in the chain.

Moreover, since the safe limit speed is determined in advance, it is useful, in an embodiment of the invention, to take into account the available grip potential in real time in order to warn the driver of a risk of ultimately not observing this condition. Thus, in some situations, it is useful to indicate to the driver of the vehicle that it is already time to brake if the driver wants to be able to observe the speed recommended for the forthcoming bend. This warning can take the form of an audible or visual alert, for example by flashing the speed display which will be described later using figures.

BRIEF DESCRIPTION OF THE FIGURES

Other aims and advantages of the invention will become clear from the following description of a preferred but non-limiting embodiment, illustrated by the following figures in which.

DESCRIPTION OF THE BEST MODE FOR CARRYING OUT THE INVENTION

Figure 1:
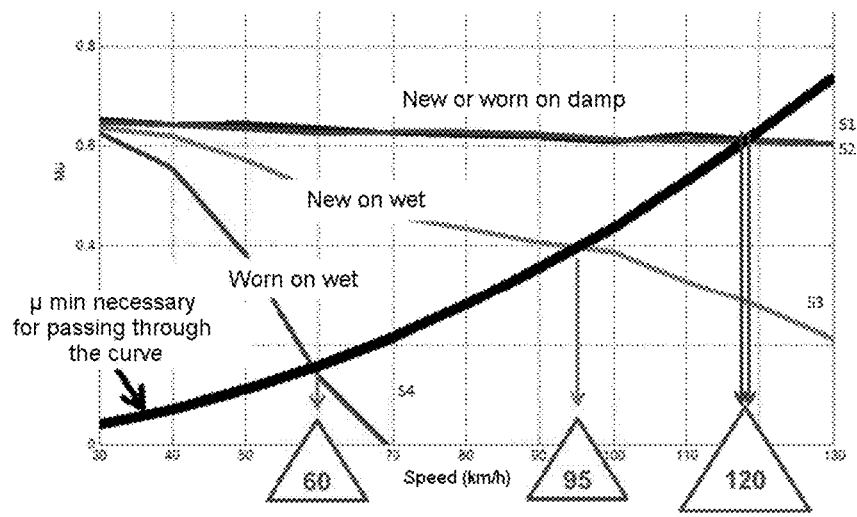
FIG. 1 shows an example of graphs that are usable in a method according to the invention, for determining an available grip potential as a function of speed.

FIG. 1 shows an example of graphs that are usable in a method according to the invention, for determining a grip potential.

Preferably, the graphs are parameterized as a function of the influencing parameters which are available when implementing the invention, for example the water depth and the tread pattern depth, and are plotted as a function of the driving speed.

The number of graphs to be created is therefore a function of the number of values of these quantities which will be measured. Typically, if two levels of wear (new/worn) and two dampness state levels (dry/wet) can be measured, four graphs corresponding to the possible combinations of these two states will be created. If some combinations lead to very close grip results, it will be possible to reduce the number of graphs.

The graphs are constructed in several steps:
Firstly, a statistical distribution of each of the model inputs is determined. As many graphs are calculated as there will be combinations of these parameters but each combination is calculated with a very reduced typical deviation about the value of the measured parameter. Typically, the identification of a worn tire makes it possible to reduce the distribution to 2 mm±1.5 mm instead of 5 mm±4 mm in the absence of this information. The accuracy of the grip estimation is greatly improved.

A random selection of N combinations chosen from these distributions of the input parameters (typically N=1000 or 10000) is carried out.

N variants of µ are calculated with these N combinations for P instances of speed (typically 11 instances of speeds varying from 30 to 130 km/h in steps of 10 km/h)

N curves µ(V) are thus plotted, each corresponding to a selection from N combinations of input parameters.

Finally, the percentile of interest is extracted from this group of curves as a function of the estimation risk targeted, for example the limit of the lowest 10% or 1% of µ.

At the end of this step, a curve µ(V) is therefore available for each possible combination of the influencing parameters.

Thus, FIG. 1 shows four curves on which:
S1 is the grip available for a new tire, on a damp road,
S2 is the grip available for a worn tire, on a damp road,
S3 is the grip available for a new tire on a wet road, and
S4 is the grip available for a worn tire, on a wet road.

It is clear from the example below that this information creates three significantly different classes of grip potential.

This approach makes it possible to reduce the amount of information to be stored without losing prediction quality since the accurate calculations are carried out upstream of utilization.

FIG. 1 also shows, in the form of a black curve, the need for grip required for a forthcoming future route event, as a function of the driving speed. For a known radius of curvature R, the need for grip as a function of speed is a parabola defined by $V^2/R$.

For each of the situations represented in the curves S1 to S4, the safety limit speed corresponds to the intersection of the black curve with each of these curves. It is then noted in FIG. 1 that, with worn tires on a wet road, the safe limit speed for passing through the forthcoming route event is 60 km/h. This speed increases to 95 km/h in the case of new tires on a wet road, and to 120 km/h in the case of a damp road, regardless of the state of the tires.

Figure 2A:
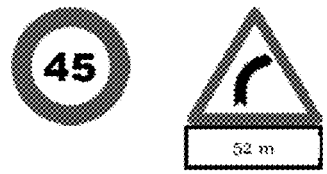
FIGS. 2a, 2b and 2c show examples of displaying, in a vehicle, safe limit speed information.
Figure 2B:
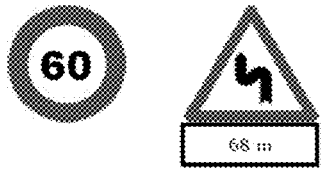
Figure 2C:
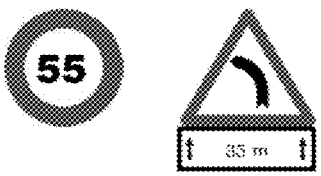

Once this safe speed has been determined, the invention provides, in an advantageous embodiment, a display, several examples of which are illustrated in FIGS. 2a to 2c. FIG. 2a shows a display example when approaching a separate bend, i.e. not included in a chain of bends. In this case, the speed to be observed for the forthcoming bend is displayed in a circular sign. It is also possible to display, in a triangular sign, the distance to reach the forthcoming bend, and the direction of curvature.

FIG. 2b shows a display example when approaching a chain of bends. The speed sign indicates the lowest safe speed from all the bends in the chain. The triangular sign indicates the distance between the vehicle and the first bend in the chain, and the fact that the chained bends are not all in the same direction.

FIG. 2c shows a display example during a chain of bends. The speed sign indicates the lowest safe speed from all the remaining bends to be covered in the chain, and the triangular sign indicates the distance to be covered before the end of the chain.

Figure 3A:
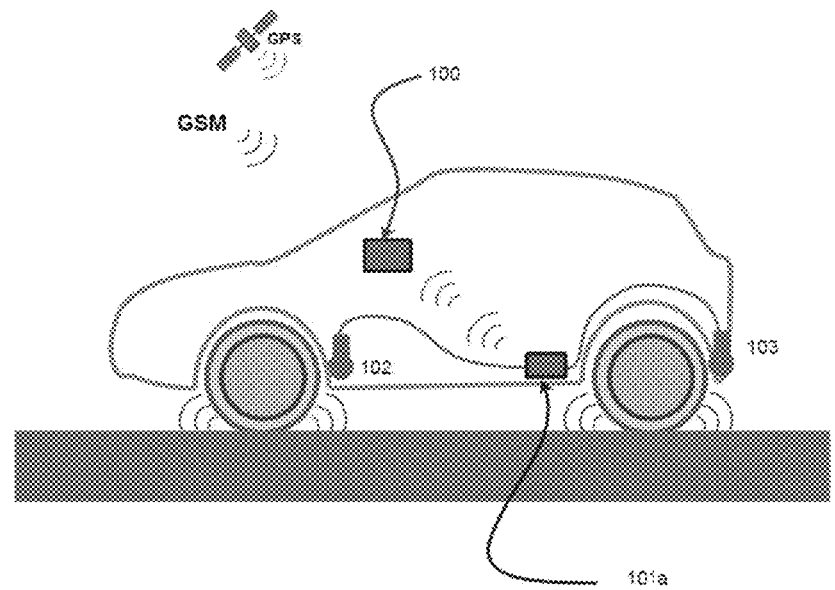
FIGS. 3a and 3b show examples of implementing a method according to the invention in a vehicle.
Figure 3B:
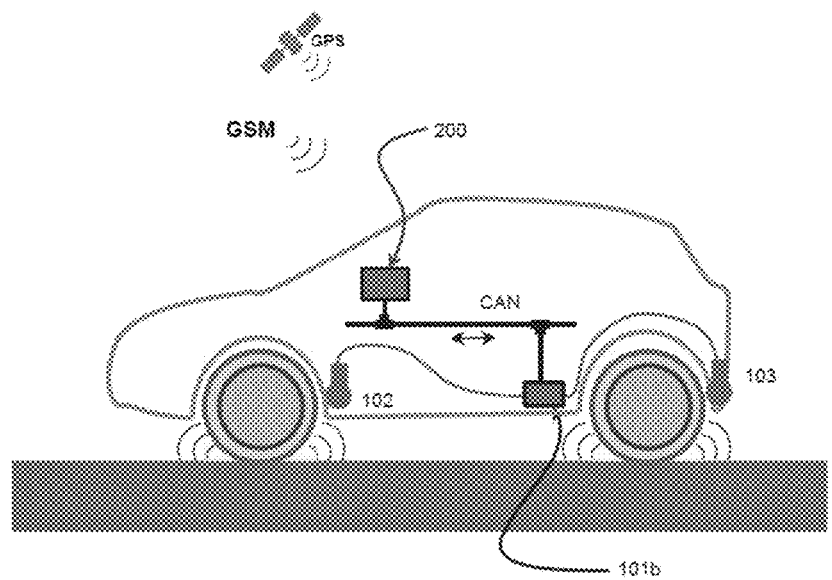

FIGS. 3a and 3b show examples of implementing a method according to the invention in a vehicle. FIG. 3a more particularly shows an implementation using a device connected in a non-integrated manner to the vehicle, of smartphone or tablet type. Thus, in this embodiment, the device 100 comprises GSM communication means for receiving external data such as maps or traffic or other information. In addition, the device 100 comprises means for receiving information enabling the GPS geolocation of the vehicle or a determination of the speed of the vehicle.

The vehicle also comprises a computer 101*a* fitted in the vehicle, and connected to various sensors such as microphones 102 and 103. This computer 101*a* comprises means for processing the signals coming from the sensors 102 and 103 in order to obtain information concerning a water depth on the road, a texture depth of the road, and a wear or pressure state of the tire. In another embodiment, not shown in the figure, the vehicle further comprises other sensors, such as sensors for temperature, wear, pressure, etc., which are fitted directly on the vehicle and/or on the tires. In this case, the computer 101*a* comprises means for processing the signals coming from all of the sensors.

After processing, the information is sent from the computer 101*a* to the device 100, which implements a method according to the invention to determine a limit speed for driving, and to display it on a screen integrated in the device 100.

In the example shown in FIG. 3*b*, a method according to the invention is implemented directly in the computer 101*b* of the vehicle. As above, this computer is connected to sensors 102 and 103 which have the same functions as in the example of FIG. 3*a*. However, in this example, the computer 101*b* is connected to the CAN bus of the vehicle, in order to read information such as the speeds and/or accelerations of the vehicle.

The display and command module 200 integrated in the vehicle comprises GSM communication means for receiving external data such as maps or traffic or other information and means for receiving information enabling the GPS geolocation of the vehicle. It can make this information available to the computer 101*b* over the CAN communication bus.

This module 200 is also supplied with display means for displaying the determined limit speed for driving, so as to inform the driver.

In an embodiment, the characteristics of the tire are taken into account to implement the method. To this end, these characteristics are stored in a memory of the vehicle, and/or an identifier of the tire is read by RFID reading, and associated with characteristics stored in a database, and/or the grip model implemented in the computer 101*b* or in the device 100 is chosen from a set of grip models according to an identifier of the tire.

The invention claimed is:

1. A method for determining a limit speed for driving, for a driver at a steering wheel of a vehicle, the method comprising steps of:
  determining at least one parameter that influences grip potential, the at least one parameter being selected from the group consisting of (a) pressure of a tire, (b) depth of a tread pattern of the tire, (c) water depth on a roadway, and (d) sand depth on the roadway;
  estimating, in accordance with the at least one parameter determined in the determining, a grip potential available at a given instant between a tire of the vehicle and a roadway on which the tire is running;
  determining a need for grip on an forthcoming route event as a function of a driving situation of the vehicle; and
  based on a function of the need for grip and the estimated grip potential, determining a limit speed for driving on the forthcoming route event.

2. The method according to claim 1, wherein the step of determining a need for grip includes substeps of:
  identifying the forthcoming route event; and
  determining a set of geopositioned points forming the forthcoming route event.

3. The method according to claim 2, further comprising a step of determining a radius of curvature of the forthcoming route event,
  wherein the step of determining a need for grip takes into consideration the radius of curvature of the forthcoming route event and an analytical model of the vehicle.

4. The method according to claim 1, further comprising a step of correcting the limit speed for driving using a correction factor.

5. The method according to claim 1, wherein the determining determines a plurality of parameters selected from the group consisting of: (a) a grip number or standardized indicators of grip for the roadway, (b) the sand depth on the roadway, (c) the water depth on the roadway, (d) a temperature, (e) the pressure of the tire, (f) the depth of a tread pattern of the tire, (g) a load of the tire, and (h) a driving speed.

6. The method according to claim 5, wherein the step of determining parameters that influence grip potential includes substeps of:
  measuring a sound power generated by the tire during driving of the vehicle; and
  determining the water depth on the roadway and the depth of the tread pattern of the tire.

7. The method according to claim 1, wherein the step of estimating a grip potential available includes substeps of:
  assessing a progression of a rolling radius of the tire as a function of predetermined conditions for running of the tire on grounds of variable and known grips, in order to form an experimental database;
  using the experimental database to establish an estimation model for estimating grip potential by determining a function connecting grip potential to rolling radius and to vehicle parameters; and
  during running of the tire, and as a function of the vehicle parameters, determining the rolling radius and assessing the grip potential of the tire using the estimation model.

8. The method according to claim 1, wherein the step of estimating a grip potential available is performed as a function of a speed of the vehicle by applying a mathematical formula implemented by an electronic computer on the vehicle.

9. The method according to claim 1, wherein the step of estimating a grip potential available is performed as a function of a speed of the vehicle by using a predetermined graph for grip level.

10. The method according to claim 1, wherein the step of determining a limit speed for driving includes determining an intersection between a need for grip expressed as a function of driving speed and an available grip potential expressed as a function of driving speed.

11. The method according to claim 1, further comprising a step of informing the driver of the determined limit speed for driving.

12. The method according to claim 1, wherein the at least one parameter comprises the pressure of the tire.

13. The method according to claim 1, wherein the at least one parameter comprises the depth of a tread pattern of the tire.

14. The method according to claim 1, wherein the at least one parameter comprises the water depth on the roadway.

15. The method according to claim 1, wherein the at least one parameter comprises the sand depth on the roadway.

16. The method according to claim 1, wherein the at least one parameter comprises the pressure of the tire, the depth of a tread pattern of the tire, and the water depth on the roadway.

\* \* \* \* \*